Sept. 1, 1936.　　　　　M. M. GIRZ　　　　　2,053,245
NONCOLLAPSIBLE PNEUMATIC TIRE
Filed Dec. 23, 1935　　　2 Sheets-Sheet 2
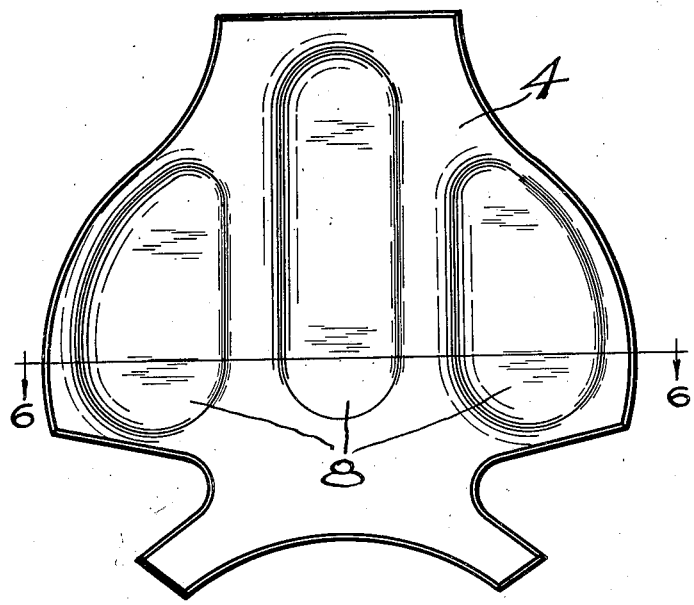
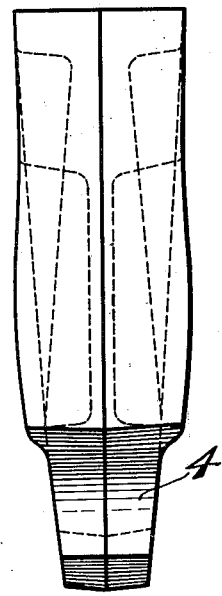
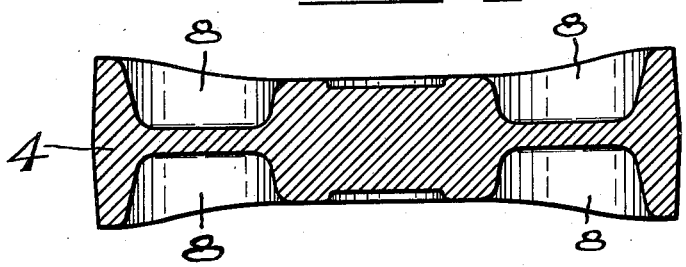
INVENTOR
Max M. Girz
BY Martin J. Madion
ATTORNEY Patented Sept. 1, 1936

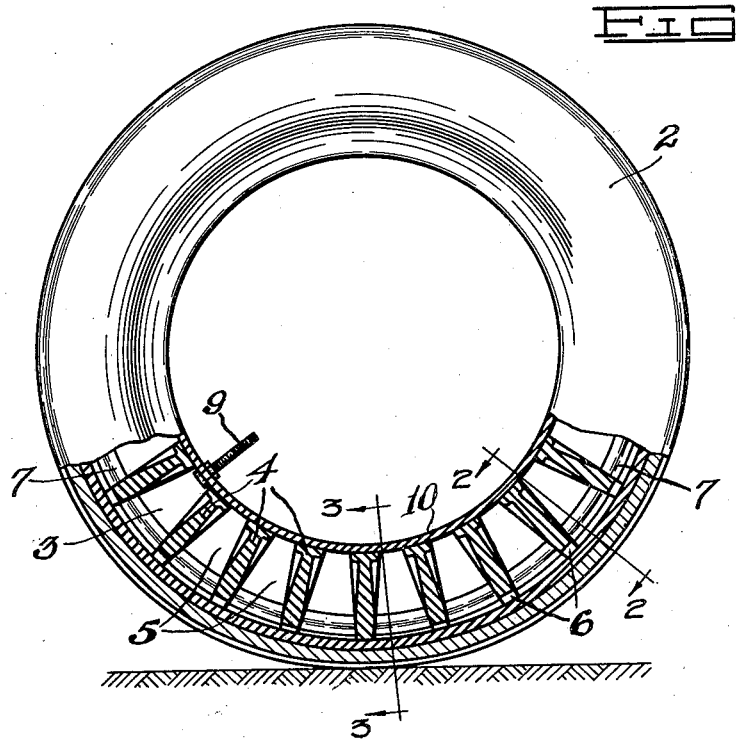
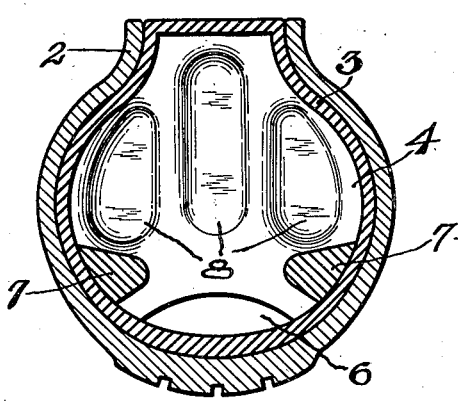
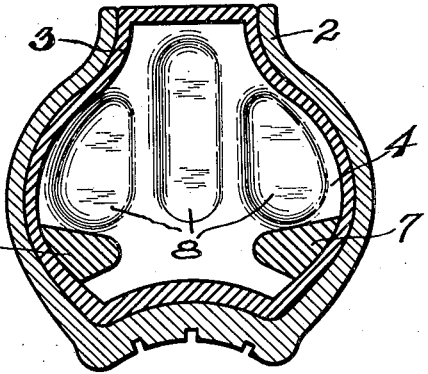

2,053,245

UNITED STATES PATENT OFFICE 2,053,245

NONCOLLAPSIBLE PNEUMATIC TIRE

Max M. Girz, Akron, Ohio, assignor of fifty-one one-hundredths to Clarence J. Bertschy, Wheeling, W. Va.

Application December 23, 1935, Serial No. 55,710

5 Claims. (Cl. 152—10)

This invention relates broadly to pneumatic tires for the wheels of vehicles, particularly automobiles, and more particularly to an inner tube for the outer casings of such tires.

One of the objects of the invention is to provide an inner tube which will render the tire noncollapsible when punctured, the inner tube having means embodied therein which will, in cases of necessity, sustain the weight of the vehicle when the air has been exhausted from the tube when punctured, thus eliminating rim cuts and other damage to the tire casing caused by collapse of the side walls.

Another object of the invention is to provide a vehicle tire of the character mentioned which is not readily subject to punctures permitting the escape of the air contained therein.

Another and important object of the invention is to provide a tire wherein the air contained therein is at all times under control, thus substantially eliminating uncontrolled jarring or bouncing of the vehicle wheels when the vehicle is suddenly stopped, an objectionable item of tires now in common use.

A still further object of the invention is to provide a tire wherein the chance of a "blowout" (the sudden and instantaneous escape of air) is substantially eliminated.

With these and other objects in view, the invention resides in the features of construction and arrangement of parts which will hereinafter be described, reference being had to the accompanying drawings in which Figure 1 is a side view of a tire casing equipped with my improved inner tube, a portion of the casing and tube being broken away and shown in vertical section to illustrate the inner construction of the tube;

Figure 2 is an enlarged vertical sectional view taken on line 2—2, Fig. 1;

Figure 3 is an enlarged vertical sectional view taken on line 3—3, Fig. 1;

Figure 4 is an enlarged detail view in front elevation of one of the pillars;

Figure 5 is an end elevational view of the same; and—

Figure 6 is a sectional view taken on line 6—6, Fig. 4.

Referring to said drawings, the reference numeral 2 designates the usual form of rubber outer tire casing consisting of a highway contacting peripheral tread and ordinary side walls.

Located within the casing is the conforming circular inner tube 3, also made of rubber. A plurality of spaced radially disposed pillars 4, preferably made of resilient rubber, extend transversely across the interior of the tube dividing the latter into a plurality of compartments or chambers 5, said chambers being connected together by means of the ports 6 provided in each of the pillars 4 at the outermost end thereof next adjacent the tread portion of the tire.

Each of the pillars 4 has formed in the opposite sides thereof two recesses for receiving a supporting rib 7, which is fastened to the inner wall of the tube and extends throughout the entire circular extent of the latter.

As depicted in the drawings, each of the pillars 4 is so formed that it has a greater thickness at its inner end than at the thickness at the outer end, the same tapering in thickness toward the outer end, as shown in Figs. 1 and 5 of the drawings. Moreover, each of said pillars has its opposite face surfaces provided with a series of appropriately shaped recesses or webs 8 for lessening the weight and increasing the flexibility thereof, a feature greatly to be desired and which will hereinafter be fully explained.

In practice, the tube 3 and casing 2 are assembled as shown in the drawings and the tube inflated with air to a predetermined pressure by means of the valve 9 penetrating the inner peripheral strip 10 contacting the rim of the wheel (not shown), the air being equally distributed throughout the tire and into each of the chambers through the communicating ports 6. So inflated, the weight of the vehicle is sustained by the air under pressure contained within the tire. If, however, the tire should become punctured and permit the escape of the air, the weight of the vehicle will be sustained by the pillars 4 and the tire thereby prevented from collapsing. Obviously, the vehicle may be driven in such a deflated condition until convenient to make repairs.

While the non-collapsible feature of my tire is to be desired, yet, perhaps, greater stress may be appropriately placed upon the feature of controlling the air contained in the tube under pressure when inflated. Air under pressure in a tire sustaining the weight of a moving vehicle, as an automobile, is not inert. In present forms of pneumatic tires the cross sectional area of that segmental portion of the tire contacting the highway and sustaining the weight of the vehicle is decreased, thus displacing a portion of the air, which latter is forced in opposite directions into the remaining portion of the tire. Consequently, at comparatively high speeds the air is subject to constant and violent agitation with resultant heating of the tire caused by friction of the agitated air. Additionally, when the automobile is brought to a sudden stop the tire, wheel and vehicle are subjected to a series of uncontrollable minute rebounds caused by the agitation of the air in the tire and such rebounds continue until rotation of the tire ceases and the air becomes inert. The rebound of tires is objectionable and dangerous in congested areas and particularly on slippery highways or surfaces.

In my improved form of tire, the air contained within the segment of the tire contacting the highway and sustaining the weight of the vehicle is trapped within the chambers located within the segment and remains motionless and inert and, therefore, cannot cause agitation of the air in the remaining portion of the tire. This desirable feature is accomplished in the following manner. As the tire is brought into road contacting relation, the resilient pillars 4 in that affected segment of the tire are depressed by the sustained weight and said pillars are compressed to a point where those parts of the pillars defining the air passage ports 6 are brought into contacting relation with the elevated tread portion of the tire, as illustrated in Fig. 3, for closing the ports and trapping the air within the affected chambers. Thus, the air so trapped cannot be forced into the remaining portion of the tire where it would result in air agitation. There being no agitation of air, the objectionable rebounding experienced when stopping is not here experienced. Obviously, as the segment of the tire revolves from highway contacting position, the ports 6 automatically open due to the resilience of the pillars, tube and casing, and said ports are again in communicating relation for the circulation of air in one direction until such time as again brought into closed weight-sustaining position.

It may also be here pointed out that, should the tube become punctured or otherwise ruptured, as from road-shock, the tire cannot "blow-out" or lose its air instantaneously because the ports will restrict the passage of air through the tire to the place of rupture.

The provision of the series of webs 8 in each pillar lends lateral flexibility thereto in order to permit expansion to compensate for the air under pressure contained within the chambers. Otherwise expressed, such flexibility permits the pillars to expand to correspond with the cross sectional area of the chambers so as to prevent the side walls of the tube from bulging beyond the lateral extent of said pillars.

The reinforcing ribs 7 are provided to maintain the pillars in their true radially disposed positions and to prevent tipping when subjected to imposed weight.

The tube is preferably formed by positioning the inner ends of the pillars 4 in suitable receiving slots disposed radially about the periphery of a forming wheel, after which rubber in strip form is wrapped thereabout to form the side walls. The so partially formed tube is then taken from the forming wheel and the inner rim contacting strip 10 applied. It will be understood that rubber is the sole material used in the production of the tube, and that the rubber is only partially cured when assembled. Following assembling and forming, the tube and pillars are together appropriately and further cured so as to become an integral structure.

It is thought that the invention and many of its attendant advantages will be understood from the foregoing description, and it will be apparent that changes may be made in the form, construction and arrangement of the parts without departing from the spirit and scope of the invention or sacrificing all of its material advantages, the form hereinbefore described being merely a preferred embodiment thereof.

What is claimed is—

1. In a device of the character described, an inflatable circular tube having a plurality of spaced resilient pillars disposed transversely interiorly thereof to divide said tube into a plurality of chambers, and a port in each of said pillars at the edge contacting the peripheral tread portion of the tube affording communication between adjoining chambers adapted to close upon imposition of weight on said pillars to isolate the chambers defined by the pillers sustaining the imposed weight.

2. In a device of the character described, an inflatable circular tube having a plurality of spaced resilient pillars disposed transversely interiorly thereof to divide said tube into a plurality of chambers, and ports at the end of said pillars affording communication between adjoining chambers adapted to close upon imposition of weight on said pillars to isolate the chambers defined by the pillars sustaining the imposed weight, each of said pillars having concavities in its opposite face surfaces.

3. In a device of the character described, an inflatable circular tube having a plurality of spaced resilient pillars disposed transversely interiorly thereof to divide said tube into a plurality of chambers, each of said pillars at the edge contacting the peripheral tread portion of the tube having segmental cut-out portions to provide communicating ports between adjoining chambers.

4. In a device of the character described, the combination of an outer tire casing, an inner inflatable circular tube embraced within said casing having a plurality of spaced pillars disposed transversely interiorly thereof to divide said tube into a plurality of chambers, and an arcuate communicating passage in each pillar at the edge contacting the peripheral tread portion of the tube adapted to temporarily close when the segment of the tire in which it is housed is brought into highway-contacting position.

5. In a device of the character described, an inflatable circular tube having a plurality of spaced resilient pillars disposed transversely interiorly thereof to divide said tube into a plurality of chambers, and an arcuate port in each pillar adjacent the periphery of the tread portion of the tube affording communication between adjoining chambers adapted, when said tube is inflated, to close upon imposition of weight on said pillars to isolate the chambers defined by the pillars sustaining the imposed weight, and adapted to again assume open communicating relation upon release of the imposed weight.

MAX M. GIRZ.